March 24, 1942. H. ST. PIERRE 2,277,567
CHAIN LINK AND METHOD OF MAKING THE SAME
Filed May 19, 1941
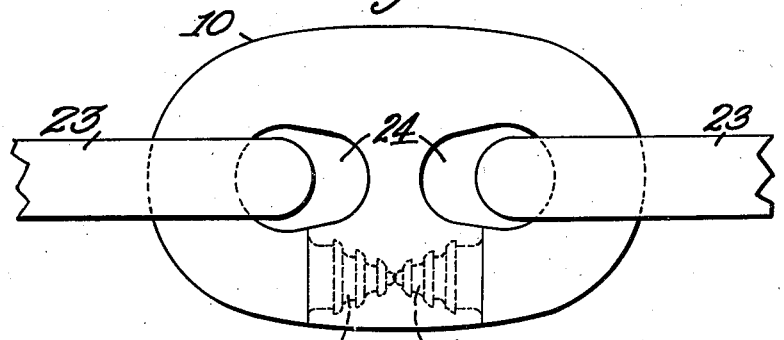
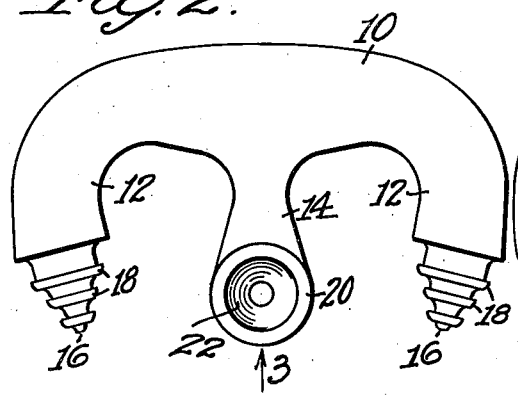
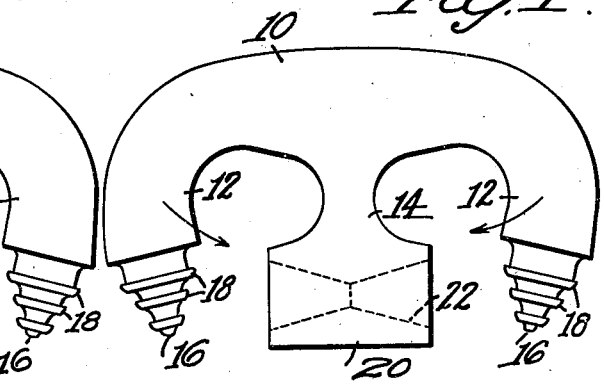
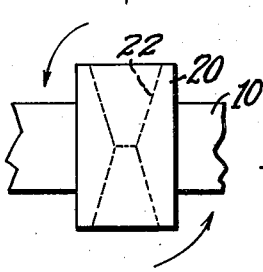
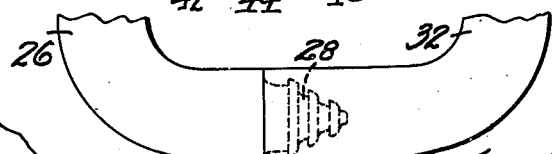
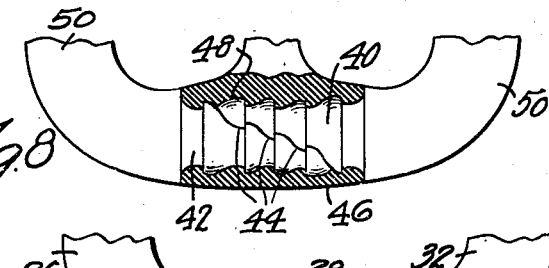
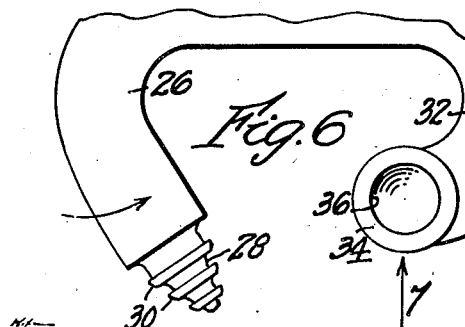
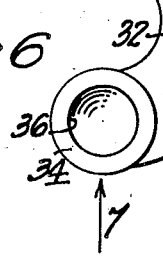
Inventor
Henry St. Pierre
Attorney
Charles R. Ray Patented Mar. 24, 1942

2,277,567

UNITED STATES PATENT OFFICE 2,277,567

CHAIN LINK AND METHOD OF MAKING THE SAME

Henry St. Pierre, Worcester, Mass.

Application May 19, 1941, Serial No. 394,088

15 Claims. (Cl. 59—35)

This invention relates to new and improved forged chain locking links and includes manufacturing processes of stud and other type links.

Objects of the invention include the provision of a stud chain locking link wherein the blank therefor is forged by straight hammer blows in a form having two opposed link connecting members and a stud having a bore element for receiving the members, so that a closed link may be entered into the spaces between each member and the stud, the bore element being at a right angle to its final position and bent or twisted into position to receive the connecting members after assembly of the two adjacent closed links; the provision of a stud link as above described wherein the connecting members abut within the stud bore; the provision of a stud link wherein the connecting members overlap and have lateral projections or shoulders engaging each other and the walls of the bore; the provision of a plain link blank which is made by straight hammer blows by having an end forged out of the link's plane and provided with a bore, and a male connection for entering the bore in the finishing forging operation; and the provision of novel methods of manufacture of the links above described.

Other objects and advantages of the invention will appear hereinafter.

Reference is to be had to the accompanying drawing, in which

Fig. 1 shows one form of stud link in finished form and assembled in a chain;

Fig. 2 shows the blank from which the link of Fig. 1 is made;

Fig. 3 illustrates the twisting of the stud bore element prior to bending in the connecting members and looking in the direction of arrow 3 in Fig. 2;

Fig. 4 is a plan view of a link after the stud bore element has been twisted into the plane of the link;

Fig. 5 shows a plain link in finished form, with parts broken away;

Fig. 6 shows the blank from which the link of Fig. 5 is made;

Fig. 7 is a front view of the upturned female connecting member of a blank looking in the direction of arrow 7 in Fig. 6; and Fig. 8 is a plan view of a modified stud link connecting construction with parts broken away and part in section.

Referring first to Figs. 2 and 3, the blank illustrated comprises a side run 10 having arms 12 at angles thereto but in the same plane, a stud 14, a pair of male connecting members 16 having shoulders 18; and a stud end ring element or cylinder 20. This ring is made at right angles to the plane of the link, and is slightly larger in diameter than the arms 12. Ring 20 is provided with an hour-glass shaped bore 22, as shown, which may extend completely thru the ring. It will be apparent that this blank may be forged out from a solid metal piece by straight hammer blows, as there are no openings located parallel to the link plane, as for instance at 7 in Patent No. 1,753,941 to Reid et al. Hence the dies used to form the present blank will each impress one-half the blank, the parting line being at the waist of the hour-glass bore 22, one-half the height of the blank and of the ring 20. In some cases the bore 22 will not be a thru bore, as where it is not desired to abut the ends of connecting members 16 in the final form of the link, but in any case, ring 20 will be referred to as "hollow" for convenience.

The blank above described provides wide entrance openings between arms 12 and the ring 20, for the easy reception of solid stud links 23 of outline similar to the link of Fig. 1. Since the ring is at right angles to the link's plane, it cannot interfere with the chain assembly as it might if formed as shown in Fig. 4, and in the latter case, the blank could not be forged in a single operation by straight hammer blows, as the ring bore could not be made in the same operation as the link body. The side run 10 may be of any desired dimensions or construction, but will be referred to as "solid" merely to distinguish it from the connection side.

When a solid link has been positioned at each side of the stud 14, any appropriate means is utilized to twist the ring thru 90° so that it lies in the plane of the link, see Fig. 4; the arms 12 are bent inwardly together so that connecting members 16 will be lodged in the opposite hollows of the bore 22, which is heated, and a blow is struck radially of the ring to contract it and to force the heated metal thereof behind the connecting members' shoulders 18, the members 16 being cold, to obtain a permanent locking of the arms 12 to the stud member. By this means a chain of three large section stud links may be produced, and this operation is continued to produce continuous chain. It is to be particularly noted that the forging operation on the heated ring will squeeze the metal thereof longitudinally as well as radially to fill up the entire space between the ends of arms 12. Any protruding fins due to the forging are of course trimmed off as usual.

Heavy duty chain links are made in dimensions approximating the links here shown. The stud is of small width compared to the ends of the links, or arms 12 as here identified, the latter being the members which must be moved into the blank of Fig. 2 between its stud and open arms. The openings 24 of the finished link are but slightly wider than the arm of a link 23 passing therethru, so that a wider space for reception of an arm of a solid link is necessary than in the prior art links of the patent named above. The present construction permits formation of heavy stud link chains in groups of three links, a central lock link and end solid links, for the easy formation of continuous chain, and avoids the necessity of consecutive link by link assembly utilized for such chains heretofore. At the same time a continuous solid undivided stud is obtained in a one-piece undivided chain blank for a lock link.

Figs. 6 and 7 illustrate a blank for making a plain locking link, this blank also being forged in a die by straight hammer blows in one operation. This link comprises arm 26, forged connecting member 28 having locking shoulders 30, arm 32 having right angle hollow connecting member 34, and conical opening 36. The member 34 is bent into the link plane as indicated by the arrow in Fig. 7 to a position in the link plane to receive connecting member 28 when arm 26 is bent as indicated by the arrow in Fig. 6. A forging operation action radially of the joint is all that is necessary to complete the link, in a manner similar to the forging of ring 20 to connecting members 16.

Fig. 8 illustrates a modification of the stud link of Fig. 1, and is made in the same way except that the connecting members 40, 42 are specially shaped in the initial forging operation to interfit when assembled along complementary locking shoulders 44. The stud end ring 46 is forged in the same manner as ring 20 but has a cylindrical bore rather than one of hour-glass shape, in order to receive the overlapping members 40, 42.

As shown, the members 40, 42 lock with each other along shoulders 44 which are preferably straight and plane but are not necessarily so; and each member locks with the stud ring along circular surfaces as at 48 to thus provide a strong lock between the connecting ends of arms 50 of the link as well as obtaining the equivalent of the stud ring lock shown in Fig. 1.

It will be seen from the above description that this invention provides new and improved heavy duty chain links of both stud and plain type, and a novel method of improved design, exceptional simplicity, and ease of operation for the manufacture thereof. By the method disclosed herein, heavy links of the type shown may be assembled in units of three for the first time, it being no longer necessary to assemble chains of this type by the continuous single link addition procedure, with the additional benefits that the studs are integral and undivided and that the complete initial blank is forged at a single hammer operation. The cost of manufacture is considerably reduced, both by reason of the fact that every other link in the chain is solid, and because the slow and costly consecutive link assembly may be done away with. More important, the links of the present invention are made without welding, so that non-weldable special alloys may now be utilized for high strength chain, and the links and chain may be heat treated for additional strength without the liability of spoiling welds. It is to be noted that the connections illustrated may be duplicated in the "solid" side 10 without departing from the scope of the invention.

Having thus described my invention and the advantages thereof, I do not wish to be limited to the details herein disclosed, otherwise than as set forth in the claims, but what I claim is:

1. A chain link comprising a solid side, a center stud, a pair of arms each having a reduced end forming a connecting portion, a hollow element on said stud, said connecting portions being located in said hollow element and locked thereto, said solid side, stud, arms, and connecting portions all being in one integral piece.

2. A chain link having a solid side portion, a stud integral with and extending from a side of said portion transverse thereof, a pair of arms at opposite sides of said stud each having a shouldered end connecting member, and a hollow element on said stud and securing the latter and the connecting members together, the latter extending into said hollow element from opposite ends thereof and being locked thereto by their shoulders.

3. A chain link of the stud type having an uninterrupted side portion, an arm at each end of said portion forming the ends of the link, a stud, a hollow element secured to the stud and positioned between the ends of the arms, the latter extending into said element from opposite ends, interengaging shoulders on the exteriors of said ends and interior of said hollow element for interlocking said ends and said element, said uninterrupted side portion, stud, and hollow element all being integral.

4. A chain link having a solid side, a stud extending from said side and integral therewith, a hollow element transverse of said stud and permanently secured thereto, said solid side having end portions extending in curves so as to approach said hollow element, a reduced shouldered connecting member at the end of each of said portions, said connecting members entering said hollow element at opposite ends, said hollow element having parts thereof interlocking with the shoulders on said members, the latter and said element forming the opposite side of said link.

5. A chain link having a solid side and stud extending therefrom, a curved end portion at each end of said solid side, said portions overlapping, a hollow element arranged transversely of said stud and receiving said overlapped portions, interengaging means between said portions and between the latter and said hollow element, said means resisting tensile forces on said portions.

6. A method of making a chain link including the steps of providing a blank having a pair of ends adapted to be connected to each other, forming a connecting portion in the general plane of the blank at one end, forming a hollow connection portion at the other end out of the general plane of the blank, bending the last named connecting portion into the plane of the blank, and joining said connections.

7. A method of making a chain link including providing a generally C-shaped blank, forming a connection at one end of said blank in the general plane thereof and simultaneously forming a connection at the other end of said blank at an angle to the general plane thereof, bending the last named connection into the plane of the blank, and joining said connections.

8. A method of making a chain link including the provision of a blank having ends extending toward each other, forming a male connecting portion at one end in the general plane of the blank, forming the other end to extend out of said plane, providing a hollow in said other end, bending the latter into said plane, entering said male connecting portion into said hollow, and applying pressure to the surface of the latter to secure said ends together.

9. A method as recited in claim 8 wherein the male connecting portion and the hollow are simultaneously forged in a die.

10. A method as recited in claim 8 wherein the male connecting portion and the hollow are forged in dies at the same time, and wherein the hollow is formed at substantially a right angle to the male connecting portion.

11. A method of making a stud link including the steps of providing a blank having a solid side, two integral arms at angles to said side, and a central stud, forming connecting portions at the ends of the arms, forming a hollow ring-like element on the stud with the axis of said element at substantially a right angle to said connecting portions, twisting said element to place its axis in the plane of said connecting portions, and entering the latter in said element.

12. A method of making a die-lock stud link including forging a blank having a solid side, two ends curved toward each other, and a central stud, forming shouldered male connecting portions on said ends in the general plane of the blank, forming a substantially hollow ring-like element on said stud at an angle to said plane, bending said element about the general axis of said stud into said plane, entering said connecting portions in said hollow element, and applying pressure to said element.

13. A method as recited in claim 12 including overlapping said connecting portions within said ring-like element prior to the application of pressure thereon.

14. A method of making a die-lock stud link comprising the steps of forming a solid blank having a pair of ends and a stud, forging a male shouldered connecting portion at each end, forging a ring on the stud wherein the axis of said ring is transverse to the lengths of the connecting portions, twisting said ring substantially 90°, entering said connecting portions in said ring and applying heat and pressure to said ring.

15. A chain link having a substantially solid side and a side providing an interconnection of ends of said solid side, said interconnection comprising a shouldered member at each of said ends, and a single unitary element surrounding said members and having substantially complementary shoulders interfitting with said first named shoulders, said element being in the form of a solid one-piece ring or the like.

HENRY ST. PIERRE.